[19] United States Patent
Pitts, Jr. et al.

[11] 3,959,648
[45] May 25, 1976

[54] DUAL SPECTRA WELL LOGGING SYSTEM AND METHOD

[75] Inventors: Robert W. Pitts, Jr.; Houston A. Whatley, Jr., both of Houston, Tex.

[73] Assignee: Texaco Inc., New York, N.Y.

[22] Filed: Oct. 23, 1974

[21] Appl. No.: 517,131

Related U.S. Application Data

[63] Continuation-in-part of Ser. No. 379,033, July 13, 1973, abandoned.

[52] U.S. Cl............................. 250/262; 250/264; 250/265
[51] Int. Cl.² ........................................ G01V 5/00
[58] Field of Search..................... 250/262, 264, 265

[56] References Cited
UNITED STATES PATENTS 2,911,536  11/1959  Scherbatskoy..................... 250/265

Primary Examiner—Harold A. Dixon
Attorney, Agent, or Firm—T. H. Whaley; C. G. Ries; Ronald G. Gillespie

[57] ABSTRACT

A well logging system and method in which a transmitter in a borehole has at least two radiation detectors sensing either the same condition or two different conditions relating to the earth's formation traversed by the borehole and providing data pulses corresponding in number and peak amplitude to the sensed condition. The transmitter also includes a reference pulse source and circuitry for combining the reference pulses with each set of data pulses to provide combined pulse signals. Each combined pulse signal is sampled at different times by a sampling circuit which provides pulses of opposite polarity whose amplitudes correspond to the maximum amplitude pulses occurring during sampling periods. The pulses from the sampling means are conducted to surface electronics by a single conductive path such as the inner conductor and the shield of an armored coaxial cable. The surface electronics includes a pulse separation circuit which separates the pulses by polarity. Processing circuits process the separated pulses to provide records of at least two spectra. The invention is of particular utility as embodied in a nuclear logging system.

27 Claims, 9 Drawing Figures

FIG. 3A
SIGNAL $E_5$
FIG. 3B
SIGNAL $E_{5A}$
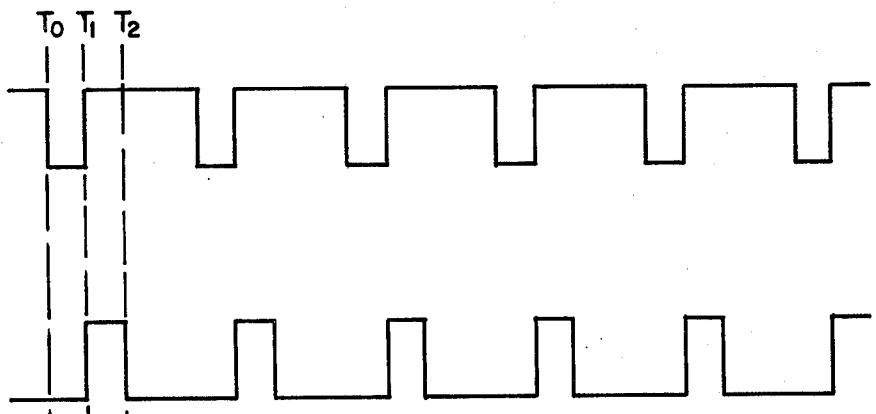
FIG. 3C
SIGNAL $E_{11}$
FIG. 3D
SIGNAL $E_{12}$
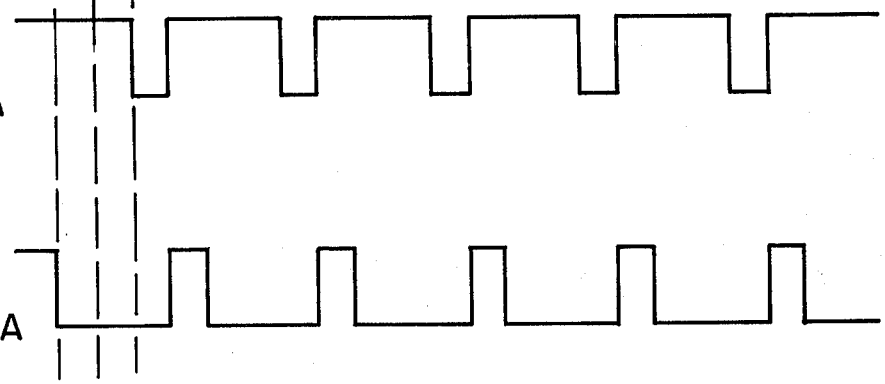
FIG. 3E
PULSES $E_{11A}$
FIG. 3F
PULSES $E_{12A}$

DUAL SPECTRA WELL LOGGING SYSTEM AND METHOD

CROSS REFERENCE TO RELATED APPLICATIONS

This application is a continuation-in-part as to all subject matter common to U.S. application Ser. No. 379,033, filed July 13, 1973 now abandoned by Robert W. Pitts, Jr. and Houston A. Whatley, Jr. and assigned to Texaco Inc., assignee of the present invention, and a continuation-in-part for additional subject matter.

BACKGROUND OF THE INVENTION

1. Field of the Invention

The present invention relates to well logging systems in general and, more particularly, to the transmission and processing of signals in a well logging system.

2. Description of the Prior Art

Heretofore, well logging systems, such as the type described in U.S. application No. 192,883, now U.S. Pat. No. 3,916,685 assigned to Texaco Inc., assignee of the present invention, provided for a single sensor for sensing one condition. The present invention allows two sensors to provide information by way of a single conductive path to surface equipment. Both sensors may sense the same condition; usually they are spaced a predetermined distance from each other. The sensors may also sense different conditions.

The desirability of using two sensors sensing two different conditions and providing separate information is evident when one considers that under the reference application two separate logging runs must be made which consume considerable time and are quite expensive. Another point is that when different conditions are being sensed they are being sensed simultaneously so that factors affecting the sensing of one condition also affect the sensing of the second condition.

SUMMARY OF THE INVENTION

A well logging system provides at least two outputs corresponding to at least one condition sensed in a borehole. The system includes a logging instrument adapted to be passed through a borehole which has at least two sensors for sensing at least one condition in the borehole. Each sensor provides a signal representative of the sensed condition. A sampling circuit periodically samples the signals from the sensing means and provides output pulses in a manner so that output pulses of one polarity correspond to the samples of the signal from one sensor and are provided during first time intervals and output pulses of another polarity correspond to the samples of the signal from the other sensor are provided during second time intervals. The output pulses are conducted to the surface where surface electronics include a circuit for receiving and separating the output pulses in accordance with their polarity. The output pulses of one polarity are processed to provide one output corresponding to the sensed condition while the output pulses of the other polarity are processed to provide a second output corresponding to the sensed condition.

The objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE DRAWINGS

FIGS. 3A through 3F are diagrammatic representations of pulses occurring during the operation of the well logging system shown in FIGS. 1 and 2.

DESCRIPTION OF THE INVENTION

Figure 1:
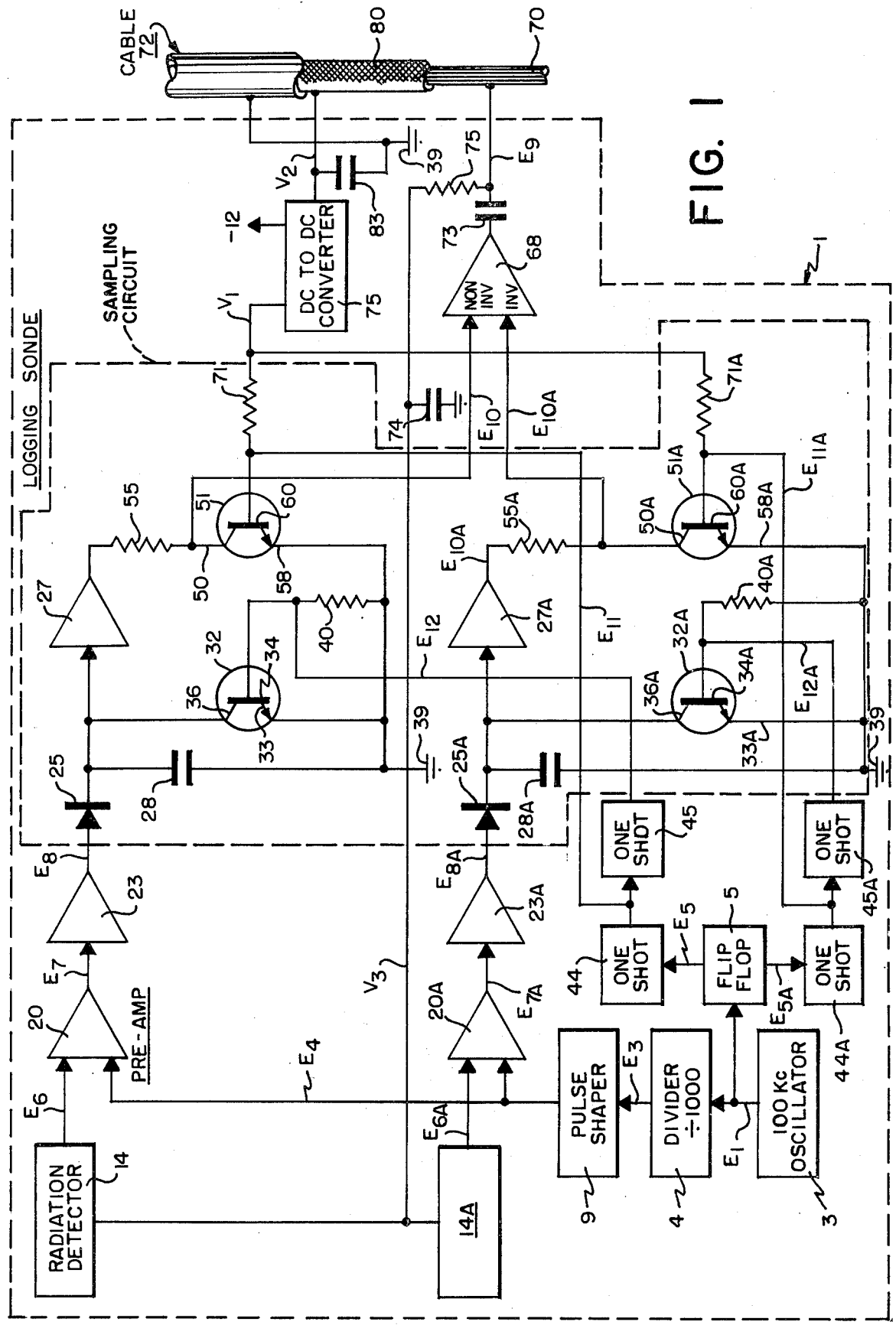
FIGS. 1 and 2 are simplified block diagrams of a well logging system, constructed in accordance with the present invention, for providing records of at least one condition relative to the earth formation traversed by a borehole.

Referring to FIG. 1, there is shown a logging instrument 1 which may be moved through a borehole and which includes a 100 KC oscillator 3 providing pulses $E_1$ to a divider 4 and to a flip-flop 5. Divider 4 provides a pulse $E_3$ for every 1000 $E_2$ pulses from oscillator 3. The pulses $E_3$ are applied to a conventional type pulse shaper 9. Pulse shaper 9 provides shaped reference pulses $E_4$.

Flip-flop 5 provides two pulse trains $E_5$ and $E_{5A}$, as shown in FIGS. 3A and 3B, respectively, in response to the $E_1$ pulses. The pulse repetition rate of pulse trains $E_5$, $E_{5A}$ is one half that of the pulse repetition rate of pulses $E_1$.

A radiation detector 14 senses a condition relative to the earth formation and provides negative going data pulses $E_6$ corresponding in number and amplitude to detected gamma radiation. The condition may be, by way of example, the chlorine content of the earth formation. Detector 14 may be a conventional type sodium iodide (thallium activated) crystal detector detecting gamma radiation resulting from the natural isotopes of the earth formation or from neutron bombardment of the earth formation. Neutron bombardment is well known in the art and it is not necessary for one skilled in the art to know the details of neutron bombardment in order to understand the present invention. Detector 14 may also include a photo multiplier tube optically coupled to a crystal detector portion which receives light pulses from the crystal detection and provides pulses $E_6$.

A preamplifier 20 receives data pulses $E_6$ and reference pulses $E_4$ to provide a pulse train $E_7$ which includes amplified data pulses $E_6$ and amplified reference pulses $E_4$ to another amplifier 23. It should be noted that the amplitude of reference pulses $E_4$ is substantially larger than the amplitude of the expected largest amplitude data pulse $E_6$ or $E_{6A}$. Amplifier 23 provides positive pulses $E_8$ through a diode 25 to a voltage follower type amplifier 27, to one plate of a capacitor 28 and to a collector 30 of an NPN transistor 32 having an emitter 33 and a base 34. The other plate of capacitor 28 and emitter 33 of transistor 32 are connected to ground 39.

The output provided by voltage follower 27 is applied to a collector 50 of an NPN transistor 51 through a resistor 55. Transistor 51 has an emitter 58 connected to ground 39 and a base 60. The collector 50 of transistor 51 is connected to a non-inverting input of an amplifier 68 whose output is provided to a conductor 70 of an armored coaxial cable 72 through a blocking capacitor 73. Cable 72 will be described in detail hereinafter.

A filtering capacitor 74, connected to ground and to a resistor 75, allows pulses $E_9$ to be applied to conductor 70 while a direct current voltage present on conductor 70 may be picked off for use as an energizing voltage for detectors 14, 14A.

Base 60 of transistor 51 receives a positive biasing direct current voltage through a resistor 71 from a DC to DC converter 75 which receives a DC voltage $V_2$ from a shield 80 of cable 72. DC to DC converter 75 may be of a conventional type well known in the art. In this instance it takes a direct current voltage of one polarity and provides two direct current voltages of equal amplitude but opposite polarity. A filtering capacitor 83 is connected between shield 80 and ground 39 to filter out any noise that may appear on shield 80 and to maintain shield 80 at a signal ground. An outer armor 84 of cable 72 is connected to ground 39.

Radiation detector 14A, preamplifier 20A, amplifier 23A, diode 25A, capacitor 28A, voltage follower 27A, transistors 32A and 51A and resistors 40A, 55A and 75A are connected in a similar manner. Pulses $E_{10A}$ from voltage follower 27A are applied to an inverting input of amplifier 68 through resistor 55A.

Pulses $E_8$ from amplifier 23 are provided to a high impedance sample and hold circuit comprising diode 25, capacitor 28, transistor 32 and voltage follower 27. Capacitor 28 charges to the peak value of the largest amplitude pulse $E_8$ occurring during the sampling period.

Each pulse $E_5$ from flip-flop 5 triggers a one-shot multivibrator 44 to provide a negative going pulse $E_{11}$, as shown in FIG. 3C, to base 60 of transistor 51 and to another one-shot multivibrator 45. Transistor 51 is turned on during the absence of a pulse $E_{11}$ and turned off by occurrence of a pulse $E_{11}$. The trailing edge of pulse $E_{11}$ triggers one-shot 45 causing it to provide a positive pulse $E_{12}$, as shown in FIG. 3D, to base 34 of transistor 32. Transistor 32 is cut off during the absence of a pulse $E_{12}$ and is turned on during the occurrence of a pulse $E_{12}$.

Referring to FIGS. 1 and 3C through 3F, just prior to time $t_o$, transistors 32 and 51 are turned off and on, respectively. At the time $t_o$ transistor 51 is turned off by pulse $E_{11}$ to effectively disconnect the non-inverting input of amplifier 68 from ground 39 so that voltage across capacitor 28 is provided to amplifier 68 as a pulse $E_{10}$. Pulse $E_{10}$ is a positive pulse whose amplitude corresponds to the amplitude of the largest amplitude pulse $E_8$ occurring during the sampling period as hereinafter explained, and whose pulse width is equal to the of pulse $E_{11}$. At time $t_1$, transistors 32 and 51 are both turned on by the occurrence of pulse $E_{12}$ and the termination of pulse $E_{11}$, respectively. Transistor 51 again shorts out the non-inverting input of amplifier 68. Transistor 32 effectively discharges capacitor 28 to remove any voltage across it.

From time $t_2$ when pulse $E_{12}$ is terminated to the time when pulse $E_{12}$ again appears, capacitor 28 is effectively sampling pulses $E_8$ passed by diode 25. Due to the nature of being a capacitor, capacitor 28 develops a voltage across it whose amplitude is the amplitude of the largest pulse $E_8$ appearing during the sampling period between pulses $E_{12}$.

Similarly transistors 32A and 51A are controlled by pulses $E_{12A}$ and $E_{11A}$, respectively, from one shot multivibrators 44A and 45A, to sample pulses $E_{8A}$, passed by diode 25A, and to cause voltage follower 27A to provide positive pulses $E_{10A}$. As can be seen in FIGS. 3C through 3F, pulses $E_{8A}$ are sampled for the same elapsed time as pulses $E_8$ but at different times while pulses $E_{10A}$ are provided at different times from the occurrence of pulses $E_{10}$. Pulses $E_{10A}$ are provided to an inverting input of amplifier 68.

Amplifier 68 provides each pulse $E_{10}$ as a positive pulse $E_9$ and each pulse $E_{10A}$ as a negative pulse $E_9$.

As mentioned hereinbefore, reference pulses $E_4$ are substantially larger than data pulses $E_6$, $E_{6A}$. When, during a sampling period, pulses $E_8$ or $E_{8A}$ include a reference pulse, the voltage across capacitor 28 or 28A charges to the amplitude of the reference pulse of pulses $E_8$ or $E_{8A}$. The next subsequent pulse $E_{10}$ or $E_{10A}$ corresponds to a reference pulse. Thus pulse $E_9$ will include positive and negative reference pulses necessary to the surface processing of pulses $E_9$.

Figure 4:
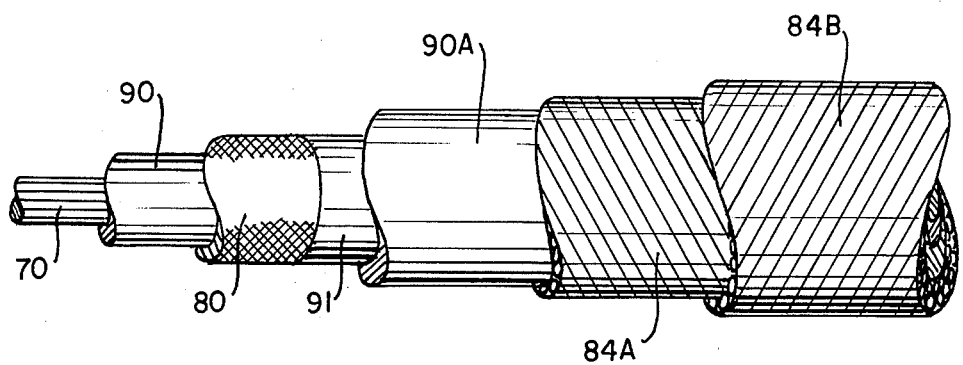
FIG. 4 is a detailed drawing of the cable shown in FIGS. 1 & 2.

Cable 72 may be of the type manufactured by the Victor Cable Company under their part number A-4029 and has an inner conductor 70, shield 80 and an outer armor 84. Armored coaxial cable 72 is shown in greater detail in FIG. 4. Conductor 70 is No. 16 AWG, 19 strands of 0.0117 inches tinned copper wires. Conductor 70 is separated from shield 80 by a coaxial insulator 90 made of a propylene copolymer dielectric having a wall thickness of 0.062 inches. Shield 80 is No. 36 AWG tinned copper wire, 9 ends, 16 carriers, 10 ppi with 90% coverage. A mylar tape 91 is wrapped around the outer side of the shield 80 with a 45% overlap. Another propylene copolymer dielectric coaxial insulator 90A has a wall thickness of 0.015 inches and separates tape 91 from armor 84. Armor 84 is divided into two sections 84A and 84B. Armor 84A is composed of 18 strands of 0.042 inches galvanized steel wires preformed right lay and has a coating of anti-corrosion compound. Armor 84B is composed of 18 strands of 0.059 inches galvanized steel wires, preformed left lay, and has a coating of an anti-corrosion compound. The opposite lays of the inner and outer armor is to prevent unravelling while in use.

Thus, cable 72 has pulse $E_9$ applied across inner conductor 70, coaxial insulator 90 and shield 80, direct current $V_2$ is applied across shield 80, coaxial insulator 90A and outer armor 84, and direct current voltage $V_3$ on inner conductor 70 with outer armor 84 as the return path.

Figure 2:
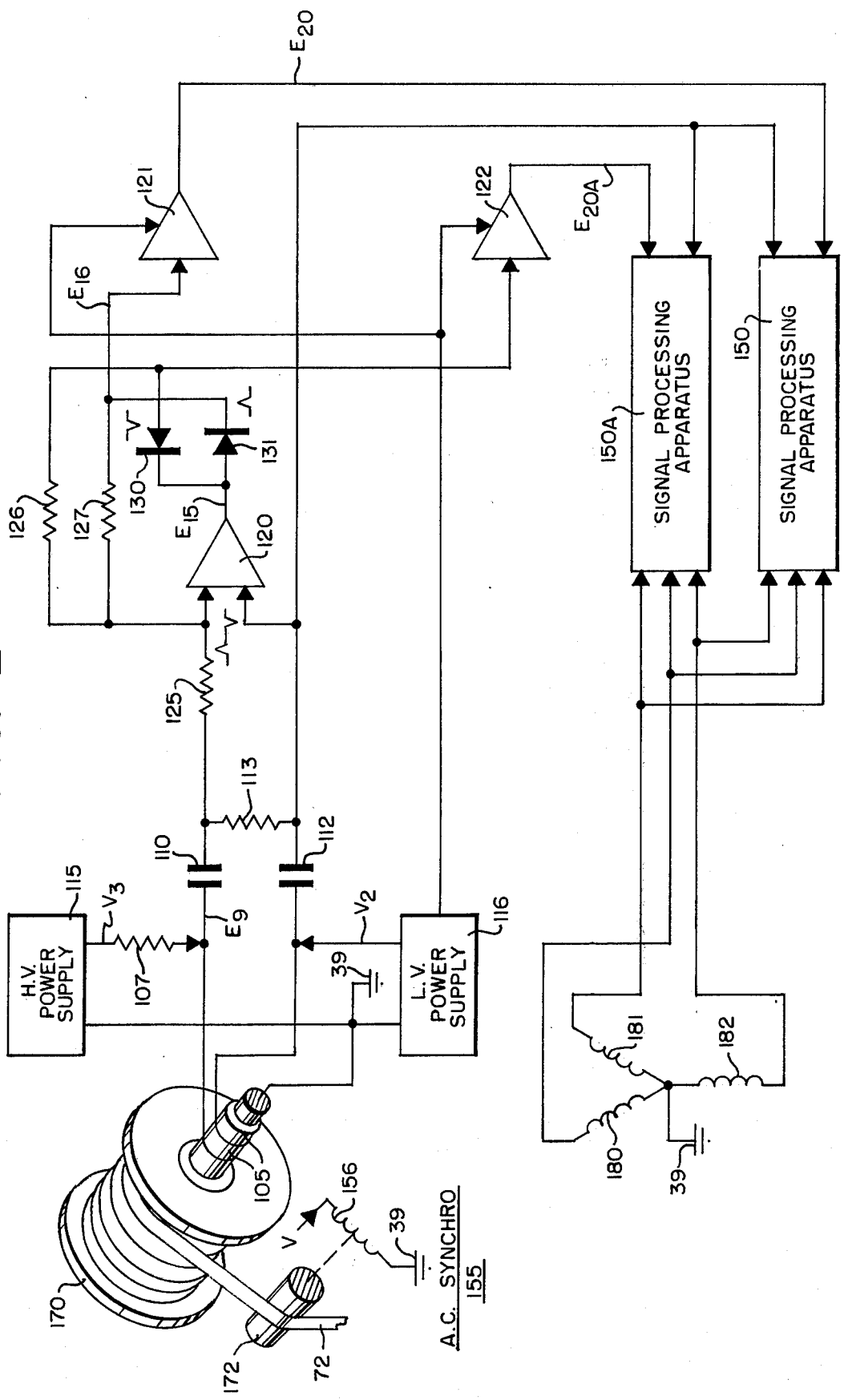

Referring to FIG. 2, the pulses $E_9$ and conductor 70 of cable 72 are provided by slip-rings 105 to capacitor 110 while the return path for pulses $E_9$ is provided by shield 80 of cable 72 through slip-rings 105 and capacitor 112. A high voltage power supply 115 provides voltage $V_3$ through a current limiting resistor 107 and slip-rings 105 to conductor 70 of cable 72. Capacitor 110 blocks voltage $V_3$ while passing pulses $E_9$.

A low voltage power supply 116 provides voltage $E_2$ to shield 80 of cable 72 through slip-rings 105. Capacitor 112 blocks voltage $V_2$ while providing a return path for pulses $E_9$. A resistor 113 connects capacitor 110 to capacitor 112 and pulses $E_9$ are developed across resistor 113.

Amplifiers 120, 121 and 122, resistors 125, 126 and 127 and diodes 130, 131 form a pulse separation circuit which separate the positive pulses $E_9$ from the negative pulses $E_9$ appearing across resistor 113. Resistors 125, 126 and 127 have the same resistance value.

When a positive pulse $E_9$ is applied through resistor 125 to amplifier 120, a positive pulse $E_{15}$ appears at the output of amplifier 120 causing diode 131 to have a very low forward impedance so that the effective gain of amplifier 120 is the ratio of the resistance value of resistor 127 to the resistance value of resistor 125, which is unity. Positive pulse $E_{15}$ is blocked by diode 130 so that no positive pulses $E_{15}$ are applied to amplifier Amplifier 121 provides a corresponding positive pulse $E_{20}$ which may correspond to a reference pulse or to the largest amplitude sampled data pulse.

Pulses $E_{20}$ are provided to signal processing apparatus 150. Signal processing apparatus may be of the type described in afromentioned U.S. application, which provides a spectral record represented by the sensed condition. When the apparatus is of the type described in aforementioned U.S. application, signal processing apparatus 150 encompasses those elements numbered 50 through 94 and as such includes a spectrum stabilizer, pulse high analyzing means, the signal processing network and recording means.

The spectral record provided by apparatus 150 is correlated to the depth at which the logging instrument 1 is passing through by means of an alternating current synchro 155 receiving a voltage $V_A$ applied to one end of a rotor winding 156 having its opposite end connected to ground 39. Cable 72 is wound on a reel 170 and as it leaves reel 170 it passes over a roller 172. Roller 172 is mechanically connected to rotor winding 156 of synchro 155. As cable 72 moves roller 172, rotor winding 156 rotates accordingly. The voltage across rotor winding 156 is inductively coupled to stator windings 180, 181 & 182 of synchro 155 having a common connection to ground 39. As rotor winding 156 rotates, voltages across stator windings 180, 181, 182 vary as a function of the angular displacement of rotor winding 156. The voltages across 180, 181 and 182 drive the recording means in signal processing apparatus 150, 150A so that the recordings are correlated sensed condition to the depth at which the condition was sensed.

A negative pulse $E_9$ results in amplifier 120 providing a negative pulse $E_{15}$ which affects amplifier 120, diode 130 and resistors 125, 126 in the same manner that a positive pulse $E_{15}$ affected amplifier 120, diode 131 and resistors 125, 127. Negative pulse $E_{15}$ passes through diode 131 and is provided to amplifier 122. Amplifier 122 provides pulses $E_{20A}$ to processing apparatus 150A which in turn provides a spectral record in the same manner that processing apparatus 150 simultaneously provides the record of the first spectra.

In another embodiment, sodium iodide crystals in detectors 14, 14A may be doped with an alpha emitting isotope such as Americium 241 or other transuranic isotopes having high energy alpha emission, low intensity and low energy gamma emission. When so doped, the crystals periodically provide a pulse which causes photomultiplier tubes in detectors 14, 14A to provide corresponding reference pulses of sufficient amplitude. Divider 4 and pulse shaper 9 may be eliminated. Amplifiers 20, 20A would be retained, but they would be used for amplification of the pulses from detectors 14, 14A and not for combining signals.

The present invention as heretofore described is a dual spectra well logging system. Two detecting means may either detect one condition, such as chlorine, or two different conditions such as carbon and oxygen, in a bore-hole. The dual spectra information is transmitted to surface electronics by a single conductive path. The surface electronics provide two spectral recordings of the sensed condition or conditions. The dual spectra well logging systems are not restricted to nuclear well logging since they are applicable to any well logging method whereby one or two conditions are sensed.

Although the well logging system of the present invention has been shown using an armored coaxial cable, it is not restricted in use to an armored coaxial cable. The number of dual spectra logs that may run simultaneously is equal to the number of conductive paths from the downhole instrument to the surface in any logging cable for the providing of such information to the surface.

What is claimed is:

1. A well logging method for providing outputs corresponding to at least one condition sensed in a borehole which comprises the following steps of sensing at least one condition in the borehole, providing two data pulse signals corresponding to the sensed condition, providing reference pulses, providing two pulse signals, each pulse signal having data pulses from a corresponding data pulse signal and reference pulses, sampling one pulse signal during first predetermined time intervals, providing output pulses of one polarity corresponding in amplitude to the largest amplitude pulses occuring in the samples of the one pulse signal during second predetermined time intervals, sampling the other pulse signal during that predetermined time interval, providing output pulses of another polarity corresponding in amplitude to the largest amplitude pulses in the samples of the other pulse signal during fourth predetermined time intervals, conducting the output pulses from the borehole, receiving the pulses at the surface, separating the received output pulses in accordance with their polarity, processing pulses of one polarity to provide a first output corresponding to the condition and processing the pulses of the other polarity to provide a second output corresponding to the condition.

2. A well logging method as described in claim 1 in which the sensing step is achieved by responding to penetration radiation, and each pulse signal contains data pulses corresponding in number and peak amplitude to the detected penetration radiation.

3. A nuclear well logging method as described in claim 2 wherein the penetration radiation is neutroninduced gamma radiation.

4. A nuclear well logging method as described in claim 2 wherein the penetration radiation is natural gamma radiation.

5. A method as described in claim 1 in which at least two conditions are sensed in the borehole, each data pulse signal corresponds to a different sensed condition, the first output corresponds to one sensed condition, and the second output corresponds to another sensed condition.

6. A method as described in claim 1 in which the data pulses in one data pulse signal correspond in number and amplitude to one condition, and the data pulses in the other data pulse signal correspond in amplitude and number to the other condition.

7. A nuclear well logging instrument adapted to be passed through a borehole comprising at least two detecting means responsive to penetration radiation in a borehole for providing data pulses corresponding in number and peak amplitude to the detected penetration radiation, means for providing reference pulses, means for providing pulse signals, each pulse signal means being connected to the reference pulse means and to a corresponding detector means and providing a pulse signal having reference pulses and data pulses from the corresponding detector means, and pulse output means connected to the pulse signal means for periodically sampling each pulse signal from the pulse signal means and providing output pulses in a manner so that output pulses of one polarity correspond in amplitude to the samples of one pulse signal and are provided during first predetermined time intervals, and output pulses of another polarity correspond in amplitude to the samples of the other pulse signal and are provided during second predetermined time intervals, said pulse output means includes storing means connected to the pulse signal means, each storing means being responsive to control pulses for storing the largest amplitude pulse occurring in a pulse signal applied to the storing means from a corresponding pulse signal means as a voltage during the time period between control pulses received by the storing means, and output means connected to the storing means, each output means being responsive to control pulses to provide the voltage from a corresponding storing means as an output pulse, and means connected to both output means for inverting the pulses from the one output means and for not inverting the pulses from the other output means to provide output pulses of one polarity in response to pulses from the one output means and output pulses of an opposite polarity in response to pulse from the other output means.

8. A nuclear well logging instrument as described in claim 7 in which each detecting means provides data pulses corresponding in number and amplitude to a different condition sensed in a borehole, the output pulses of one polarity corresponds to one sensed condition, and the output pulses of the other polarity corresponds to the other sensed condition.

9. A circuit for sampling pulses in a pulse signal occurring during a sampling time interval and for providing an output pulse corresponding to the largest amplitude pulse of the sample, comprising means for receiving the pulse signal; means connected to the receiving means for passing received pulses of one polarity with respect to ground; a capacitor connected to the passing means and to ground charges to the voltage level of the largest amplitude of a passed received pulse; means connected to the passing means, to the capacitor and to ground for discharging the capacitor in response to a discharge control pulse; means connected to the discharge means for periodically providing a discharge control pulse to the discharge means so that the time intervals between occurrence of discharge control pulses are sampling time intervals; a voltage follower amplifier means having an input connected to the connection of the capacitor and the passing means and an output for providing the voltage stored on the capacitor at its output when the amplifier means output is not grounded and for isolating the capacitor to prevent discharging of the capacitor when the amplifier means output is not grounded; output means connected to the output of the amplifier means for providing the voltage appearing at the output of the amplifier means as an output voltage; switching means connected to the output of the amplifier means, to the output means and to ground for grounding the output of the amplifier means so as to cause the voltage at the amplifier output to go to a substantially zero amplitude during the absence of a voltage control pulse and for not grounding the output of the amplifier means during the occurrence of a voltage control pulse, and means connected to the switching means for providing a voltage control pulse to the switching means during each sampling time interval so as to cause the output means to provide the output pulse.

10. A well logging instrument adapted to be passed through a borehole comprising at least two means for sensing at least one condition of an earth formation traversed by the borehole, each sensing means providing data pulses representative of the sensed condition, means for providing reference pulses, pulse signal means, each pulse signal means being connected to the reference pulse means and to a corresponding sensing means for providing a pulse signal having reference pulses and data pulses from the corresponding sensing means, and pulse output means connected to the sensing means for sampling each signal from the sensing means and providing output pulses corresponding in amplitude and polarity to the sample, where output pulses of one polarity are providing during first predetermined time intervals and output pulses of another polarity are provided are provided during second predetermined time intervals, said output pulse means includes means for providing control pulses, means connected to each pulse signal means and to the control pulse means for alternately sampling the pulses from the pulse signal means in response to the control pulses so that the pulses from one pulse signal means are sampled during third predetermined time intervals and the pulses from the other pulse signal means are sampled during fourth predetermined time intervals.

11. A well logging instrument as described in claim 10 in which the sampling means includes two network means, each network means includes a capacitor connecting a corresponding pulse signal means to ground, first switching means connected to the pulse signal means, to the control pulses means and to ground for shorting the capacitor to ground when the control pulse means provides a control pulse to the first switching means and not shorting the capacitor to ground when the contorl pulse means does not provide a control pulse to the first switching means, so that the capacitor samples and stores the largest amplitude pulse in the pulse signal provided by the corresponding pulse signal means as a voltage during each time period between control pulses provided to the first switching means, means for providing an output, second switching means connected to the control pulse means and connecting the output means to ground for shorting the output means to ground so as to cause the output to go to a substantially zero amplitude when the control pulse means does not provide a control pulse to the second switching means and for not shorting the output means to ground so as to cause the output not to go to a substantially zero amplitude when the control pulse means provides a control pulse to the second switching means, and means connecting the capacitor and the corresponding pulse signal means to the output means for providing the voltage stored on the capacitor to the output means while isolating the capacitor so that the shortiing of the output means to ground by the second switching means does not discharge the capacitor.

12. A well logging instrument described in claim 11 in which the control pulse means provides a control pulse to the second switching means in the one network means during each first predetermined time interval, provides a control pulse to the second switching means in the other network means during each second predetermined time interval, provides a control pulse to the first switching means in the one network means during each third predetermined time interval, and provides a control pulse to the first switching means in the other network means during each fourth predetermined time interval.

13. A well logging instrument as described in claim 10 in which the sampling means includes two network means, each network means include means connected to the control pulse means and to a corresponding pulse signal means for storing the largest amplitude pulse in the pulse signal provided by the corresponding pulse signal means during each time period between control pulses provided by the control pulse means to the storing means, said storing means providing the stored pulse as a voltage, and means connected to the storing means for providing the voltage from the storing means as an output pulse when the control and pulse means provides a control pulse to the output means for not providing the voltage as an output pulse when the control pulse means does not provide a control pulse to the output means.

14. A well logging instrument as described in claim 13 in which the control pulse means provides a control pulse to the output means in one network means during each first predetermined time interval, a control pulse to the output means in the other network means during each second predetermined time interval, a control pulse to the storing means in the one network means during each third predetermined time interval, and a control pulse to the storing means in the other network during each fourth predetermined time interval.

15. A well logging system for providing outputs corresponding to at least one condition sensed in a borehole, comprising a logging instrument adapted to be passed through the borehole having at least two means for sensing at least one condition in the borehole, each sensing means providing data pulses corresponding in number and peak amplitude to the sensed condition, means for providing reference pulses, means connected to each sensing means and to the reference pulse means for providing pulse signals, each pulse signal having pulses representative of corresponding data pulses and having other pulses corresponding to the reference pulses, and pulse output means connected to the pulse signal means for periodically sampling each pulse signal from the pulse signal means and providing output pulses so that output pulses of one polarity corresponding to the samples of one pulse signal are provided during first time intervals and output pulses of another polarity corresponding to the samples of another pulse signal are provided during second time intervals, said output means includes means for providing control pulses, two network means, each network means includes means connected to the control pulse means and to the pulse signal means for storing the largest amplitude pulse in a corresponding pulse signal provided by the pulse signal means during each period between control pulses provided by the control pulse means to the storing means, said storing means providing the stored pulse as a voltage, and output means connected to the storing means for providing the voltage as an output pulse when the control pulse means provides a control pulse to the output means and not providing an output pulse when the control pulse means does not provide a control pulse to the output means, and means connected to each output means for inverting the pulses from one output means and providing the inverted pulse from the one output means as the output pulses of the one polarity and the output pulse from the other output means as the output pulses of the other polarity; conductive means connecting said output pulse means in the logging instrument to surface electronics adjacent to the borehole for transmitting the output pulses from the logging instrument to the surface electronics; and said surface electronics comprising receiving means coupled to the conductive means for receiving the transmitted output pulses from the conductive means, means connected to the receiving means for separating the received output pulses by polarity, first processing means coupled to the pulse separating means for providing one output corresponding to the sensed condition in accordance with received output pulses of one polarity, and second processing means connected to the pulse separating means for providing another output corresponding to the sensed condition in accordance with the received pulses of the other polarity.

16. A well logging system as described in claim 15 in which the pulse signal means include two circuit means, each circuit means being connected to a corresponding sensing means, to a corresponding network means and to the reference pulse means and providing a pulse signal in accordance with the data pulses from the sensing means and the reference pulses from the reference signal means, each network means includes a capacitor connecting a corresponding circuit means to ground, first switching means connected to the corresponding circuit means, to the control pulse means and to ground for shorting the capacitor to ground when the control pulse means provides a control pulse to the first switching means and not shorting the capacitor to ground when the control pulse means does not provide a control pulse to the first switching means so that the capacitor effectively samples and stores the largest amplitude pulse of the pulse signal provided by the corresponding circuit means and provides a voltage corresponding to the stored pulse during each time period between control pulses provided to the first switching means, means for providing an output, second switching means connected to the control pulse means and connecting the output means to ground, for shorting the output means to ground so as to cause the output to go to a substantially zero amplitude when the control pulse means does not provide a conrol pulse to the second switching means and for not shorting the output means to ground so as to cause the output to go to the level of a voltage being provided to the output means when the control pulse means provides a control pulse to said second switching means, and means connected to the capacitor, to the corresponding circuit means, and to the output means while isolating the capacitor so that the shorting of the output means by the second switching means does not discharge the capacitor.

17. A system as described in claim 15 in which the conductive means is a transmission system comprising an armored coaxial cable connected between said logging instrument and surface electronics adjacent the borehole, said cable comprising an inner coaxial conductor, an outer coaxial conductor separated from said inner conductor by a coaxial first insulator, and an outer armor of conductive material separated from said outer conductor by a coaxial second insulator, said logging instrument further includes means for applying said output pulses to one end of said transmission system; and said surface electronics comprising receiving means coupled to the other end of said transmission system for receiving said output pulses over said armored coaxial cable from the signal applying means, means coupled to the receiving means for separating the pulses in accordance with their polarity, first processing means coupled to the pulse separating means for providing one output corresponding to the sensed condition in accordance with the received pulses of one polarity, and second processing means connected to the pulse separating means for providing a second output corresponding to the sensed condition in accordance with the received pulses of the other polarity.

18. A well logging system as described in claim 17 in which the applying means applies the output pulses across the inner coaxial conductor, the outer coaxial conductor and the coaxial first insulator.

19. A well logging system as described in claim 18 in which the outer armor of the cable is connected to ground and the logging instrument requires direct current operating voltages, and the surface electronics further comprise a direct current voltage source connected to the armored coaxial cable and providing a direct current voltage of one amplitude, with respect to ground, to the inner coaxial conductor of the armoed coaxial cable and a direct current voltage of another amplitude, with respect to ground.

20. A well logging system as described in claim 15 in which the first, second, third and fourth time intervals are predetermined, and the control pulse means provides a control pulse to the output means in one network means during each first predetermined time interval, a control pulse to the output means in the other network means during each second predetermined time interval, a control pulse to the storing means in the one network means during each third predetermined time interval, and a control pulse to the storing means in the other network means during each fourth predetermined time interval.

21. A well logging system as described in claim 20 in which the first, second, third and fourth time intervals are predetermined and the control pulse means provides the control pulse to the second switching means in the one network means during each first predetermined time interval, provides a control pulse to the first switching means in the one network means during each third predetermined time interval, provides a control pulse to the second switching means in the other network means during each second predetermined time interval, and provides a control pulse to the first switching means in the other network means during each fourth predetermined time interval.

22. A nuclear well logging system for providing outputs corresponding to at least one condition sensed in a borehole, comprising a logging instrument adapted to be passed through a borehole, said instrument including at least two detecting means being responsive to penetration radiation in the borehole for providing data pulses corresponding in peak amplitude to the detected penetration radiation, means for providing reference pulses, pulse signal means, each pulse signal means being connected to a corresponding detecting means and to the reference pulse means for a pulse signal having data pulses and reference pulses, and pulse output means connected to all the pulse signal means for periodically sampling the pulse signal from each pulse signal means and providing output pulses corresponding in amplitude and polarity to the sample in a manner so that output pulses of one polarity are provided during first predetermined time intervals and output pulses of another polarity are provided during second predetermined time intervals, said output means including means for providing control pulses, means connected to the combining means and to the control pulse means for alternately sampling the pulse signals from the pulse signal means in response to the control pulses so that the pulse signal from one pulse signal means is sampled during fourth predetermined time intervals; conductive means connected between said output pulse means in the logging instrument and surface electronics adjacent the borehole for transmitting the output pulses from the logging instrument to the surface electronics, and said surface electronis comprising means connected to the conductive means for separating the transmitte pulses by polarity, first processing means coupled to the separating means for providing an output corresponding to the sensed condition in accordance with the transmitted pulses of one polarity, and second processing means connected to the pulse separating means for providing a second output corresponding to the sensed condition in accordance with the transmitted pulses of the other polarity.

23. A nuclear well logging system as described in claim 22 in which at least two conditions are sensed in the borehole, the output pulses of one polarity correspond to one sensed condition while the output pulses of the other polarity correspond to the other sensed condition, the output from the first processing means corresponds to the one sensed condition, and the output from the second processing means corresponds to the other sensed condition.

24. A nuclear well logging system as described in claim 23 in which the sampling means includes two network means, each network means being connected to the control pulse means and to a corresponding pulse signal means for storing the largest amplitude pulse in the pulse signal provided by the corresponding pulse signal means for a sampling time interval, with each sampling time interval occurring between control pulses provided by the control pulse means, said storing means stores each said largest amplitude pulse as a voltage, and means connected to the storing means for providing the voltage from the storing means as an output pulse when the control pulse means provides a control pulse to the output means.

25. A nuclear well logging system as described in claim 24 in which the control pulse means provides a control pulse to the output means in one network means during each first predetermined time innterval, a control pulse to the output means in the other network means during each second predetermined time interval, a control pulse to the storing means in the one network means during each third predetermined time interval, and a control pulse to the storing means in the other network means during each fourth predetermined time interval.

26. A nuclear well logging system as described in claim 25 wherein the penetration radiation is neutron-induced gamma radiation.

27. A nuclear well logging system as described in claim 25 wherein the penetration radiation is natural gamma radiation.

* * * * *